(12) United States Patent
Lee

(10) Patent No.: US 8,659,887 B2
(45) Date of Patent: Feb. 25, 2014

(54) PROP STAND AND PROTECTIVE CASE STRUCTURE FOR ELECTRONIC PRODUCT

(76) Inventor: Pei-Fen Lee, New Taipei (TW)

( * ) Notice: Subject to any disclaimer, the term of this patent is extended or adjusted under 35 U.S.C. 154(b) by 171 days.

(21) Appl. No.: 13/448,690

(22) Filed: Apr. 17, 2012

(65) Prior Publication Data

US 2013/0170110 A1 Jul. 4, 2013

(30) Foreign Application Priority Data

Jan. 3, 2012 (TW) .............................. 101200111 U

(51) Int. Cl.
*G06F 1/16* (2006.01)

(52) U.S. Cl.
USPC .......... 361/679.3; 206/759; 248/418; 345/174

(58) Field of Classification Search
USPC ........ 206/795, 736, 45.24, 216, 521, 759, 37; 224/270, 101; 361/679.01, 679.55, 361/679.08, 679.56, 679.09, 679.02, 679.4, 361/679.03, 679.41, 679.26, 679.25, 679.3, 361/679.57, 679.32, 679.33; 248/125.1, 248/351, 158, 74.1, 558, 206.3, 733, 418, 248/425, 294.1, 222.14, 285, 917, 921, 248/475.1; 345/175, 173, 1.3, 204, 102, 87, 345/211, 156, 60

See application file for complete search history.

(56) References Cited

U.S. PATENT DOCUMENTS

| | | | |
|---|---|---|---|
| 6,349,864 B1 * | 2/2002 | Lee ................................ | 224/270 |
| 2011/0297581 A1 * | 12/2011 | Angel ........................... | 206/736 |
| 2013/0175200 A1 * | 7/2013 | Poon et al. .................... | 206/759 |
| 2013/0295817 A1 * | 11/2013 | Weber et al. .................. | 446/227 |

* cited by examiner

*Primary Examiner* — Hung Duong
(74) *Attorney, Agent, or Firm* — Muncy, Geissler, Olds & Lowe, P.C.

(57) ABSTRACT

A prop stand includes a guide seat mounted to a rear side of an electronic device or a protective case thereof, a revolving seat rotatably assembled to the guide seat, and a propping unit movably connected to the revolving seat via a plurality of links pivotally connected to between the revolving seat and the propping unit. The links, the revolving seat and the propping unit together form a four-bar or five-bar linkage and a rotatable structure, such that the propping unit is movable by the links between a folded and an extended position and rotatable by the revolving seat to different angular positions relative to the guide seat. Therefore, the prop stand can be easily operated to conveniently prop the electronic product in a horizontally upright position, a vertically upright position or an inclined typing position. An electronic product protective case structure with the above-described prop stand is introduced.

14 Claims, 12 Drawing Sheets

US 8,659,887 B2

PROP STAND AND PROTECTIVE CASE STRUCTURE FOR ELECTRONIC PRODUCT

CROSS-REFERENCE TO RELATED APPLICATION

This non-provisional application claims priority under 35 U.S.C. §119(a) on Patent Application No(s). 101200111 filed in Taiwan, R.O.C. on Jan. 3, 2012, the entire contents of which are hereby incorporated by reference.

FIELD OF THE INVENTION

The present invention relates to a prop stand for electronic product, and more particularly to a foldable and rotatable prop stand for directly mounting to a rear side of an electronic product or a protective case thereof. The present invention also relates to a protective case structure for an electronic product and having the above-described prop stand.

BACKGROUND OF THE INVENTION

The currently very popular personal mobile electronic products, such as tablet computers and smartphones, all have a generally rectangular flat main body without any prop structure provided on a rear side thereof, so that these electronic products are not able to stand upright by themselves and are therefore inconvenient for use in some cases. Further, since these tablet computers and smartphones usually have very exquisite surfaces, most users would not let their exquisite personal mobile products be arbitrarily put on a place, such as a desk top, in a non-protected condition to form undesirable scratch or abrasion on the outer surfaces of their personal mobile products. Currently, there is a wide choice of electronic product protective cases available for consumers. Among others, synthetic leather protective cases are most common in the market. A protective case usually internally defines a receiving space for accommodation of an electronic product with a front display of the electronic product exposed from a front open side of the protective case. The protective case also includes a folding support plate connected to a rear side thereof. The support plate in an extended position allows the electronic product to vertically or horizontally stand on a desk top. There is also one type of protective case that includes a back panel foldable into a triangular shape to thereby allow the electronic product to stand vertically or horizontally.

However, the existing protective cases do not allow users to selectively put their electronic products in different manners according to actual need, such as putting the electronic products in a vertical or a horizontal upright position suitable for viewing or in an inclined or a lying position suitable for typing. Therefore, it is desirable to overcome the problem of an electronic product without suitable prop structure and to improve the existing protective cases designed for electronic products but having insufficient propping function.

It is therefore a target of the present invention to develop a prop stand for electronic product to overcome the disadvantages in the propping structure provided by the prior art electronic product protective cases, so that the prop stand can be easily operated to conveniently prop the electronic product in different positions according to actual need in using the electronic product.

SUMMARY OF THE INVENTION

In view of the disadvantages in the prior art propping structures for electronic products, it is tried by the inventor to develop a prop stand for electronic product that can be easily operated to conveniently prop an electronic product in a desired position.

Thus, a primary object of the present invention is to provide a prop stand for electronic product that includes a four-bar or five-bar linkage and a rotating structure, such that the prop stand can be easily operated to locate between a folded position and an extended position and be rotated to different angular positions relative to the electronic product for conveniently propping the electronic product in different operating positions.

To achieve the above and other objects, the prop stand for electronic product according to a preferred embodiment of the present invention includes a guide seat for mounting to a rear side of an electronic product and being provided with at least one first rail; a revolving seat being rotatably assembled to the guide seat and provided with at least one guide element for movably engaging with the at least one first rail; a propping unit; at least one first link having a proximal end pivotally connected to the revolving seat and a distal end pivotally connected to the propping unit; and at least one second link having a proximal end pivotally connected to the revolving seat and a distal end pivotally connected to the propping unit. The first link and the second link are capable of moving the propping unit between a folded position, in which the propping unit is attached to the revolving seat, and an extended position, in which the propping unit is located away from the revolving seat and can be rest on a surface, such as a desk top, to prop the electronic product in a desired position.

According to another preferred embodiment of the present invention there is also provided a protective case structure for electronic product. The protective case structure includes a protective case being fitted on an electronic product; a guide seat for mounting to a rear side of the protective case and being provided with at least one first rail; a revolving seat being rotatably assembled to the guide seat and provided with at least one guide element for movably engaging with the at least one first rail; a propping unit; at least one first link having a proximal end pivotally connected to the revolving seat and a distal end pivotally connected to the propping unit; and at least one second link having a proximal end pivotally connected to the revolving seat and a distal end pivotally connected to the propping unit. When the electronic product is not to be propped, the first link and the second link allow the propping unit to move to a folded position, in which the propping unit is attached to the revolving seat to give the protective case a generally smooth rear side. On the other hand, when it is desired to prop the electronic product in a desired position, the first link and the second link allow the propping unit to move to an extended position, in which the propping unit is located away from the revolving seat, so that the electronic product can be propped by the propping unit on a desk top. And, according to changes of the position of the guide element in the first rail, the electronic product can be propped in different positions, such as being propped in a vertically upright position, a horizontally upright position, or a rearward inclined position.

The prop stand and the protective case structure according to the above preferred embodiments may include two symmetrically arranged first links, which are pivotally connected at respective proximal end to the revolving seat and at respective distal end to the propping unit; and one second link in the form of an arcuate bar and having a middle point as the proximal end pivotally connected to the revolving seat and two distal ends pivotally connected to the propping unit.

According to the above-described preferred embodiments, the guide seat, the revolving seat and the propping unit are ring-shaped members.

According to the above-described preferred embodiments, the propping units thereof respectively include a ring-shaped seat and a ring-shaped ornamental cap. The first link is pivotally connected at the proximal end to the revolving seat and at the distal end to the ring-shaped seat of the propping unit; and the second link is pivotally connected at the proximal end to the revolving seat and at the distal end to the ring-shaped seat of the propping unit. And, the ring-shaped ornament cap is attached to one side of the ring-shaped seat opposite to the first and second links.

According to the above-described preferred embodiments, the prop stand and the protective case structure may further include a mounting seat aligned with and fixed to one side of the guide seat opposite to the revolving sea, such that the mounting seat is attached at another opposite side to the rear side of the electronic product or the protective case, respectively; and the mounting seat is provided with at least one second rail corresponding to the at least one first rail of the guide seat.

According to the above-described preferred embodiments, the prop stand and the protective case structure may further include at least one magnetic element associated with the revolving seat or the propping unit.

In the prop stand and the protective case structure for electronic product according to the present invention, the revolving seat, the first links, the second link and the propping unit together constitute a four-bar or five-bar linkage. When the revolving seat is fixedly attached to the rear side of the electronic product or the protective case via the guide seat and the propping unit is moved by the first and second links to the folded position to attach to the revolving seat, the electronic product or the protective case may have an esthetic flat (rear) surface for a user to carry the electronic product around in a convenient manner. On the other hand, when the user wants to use the electronic product, the first and second links allow the propping unit to be pulled to the extended position and the revolving seat allows the propping unit and the first and second links to together rotate by different angles, such as a 90-degree angle, relative to the electronic product or the protective case, so that the propping unit can prop the electronic product in a horizontally upright position or a vertically upright position, depending on the user's actual need in using the electronic product. Alternatively, the first links, the second link and the propping unit can be extended from the rear side of the protective case or the electronic product with the propping unit flatly lying on a planar surface, so that the electronic product is propped in a rearward inclined position most suitable for typing.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
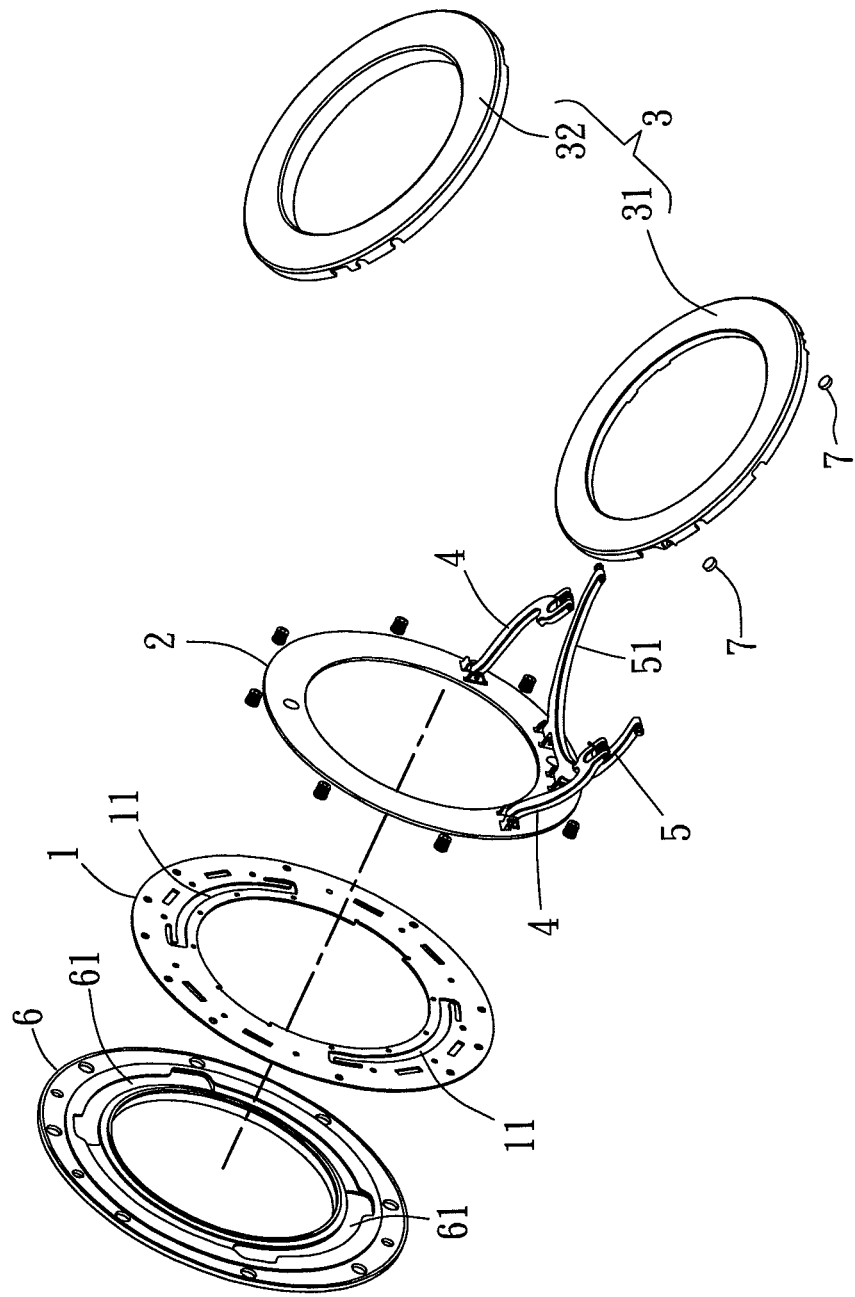
FIG. 1 is an exploded perspective view of a prop stand for electronic product according to a first preferred embodiment of the present invention viewed from a first viewing angle.

The present invention will now be described with some preferred embodiments thereof and with reference to the accompanying drawings. For the purpose of easy to understand, elements that are the same in the preferred embodiments are denoted by the same reference numerals.

Figure 2:
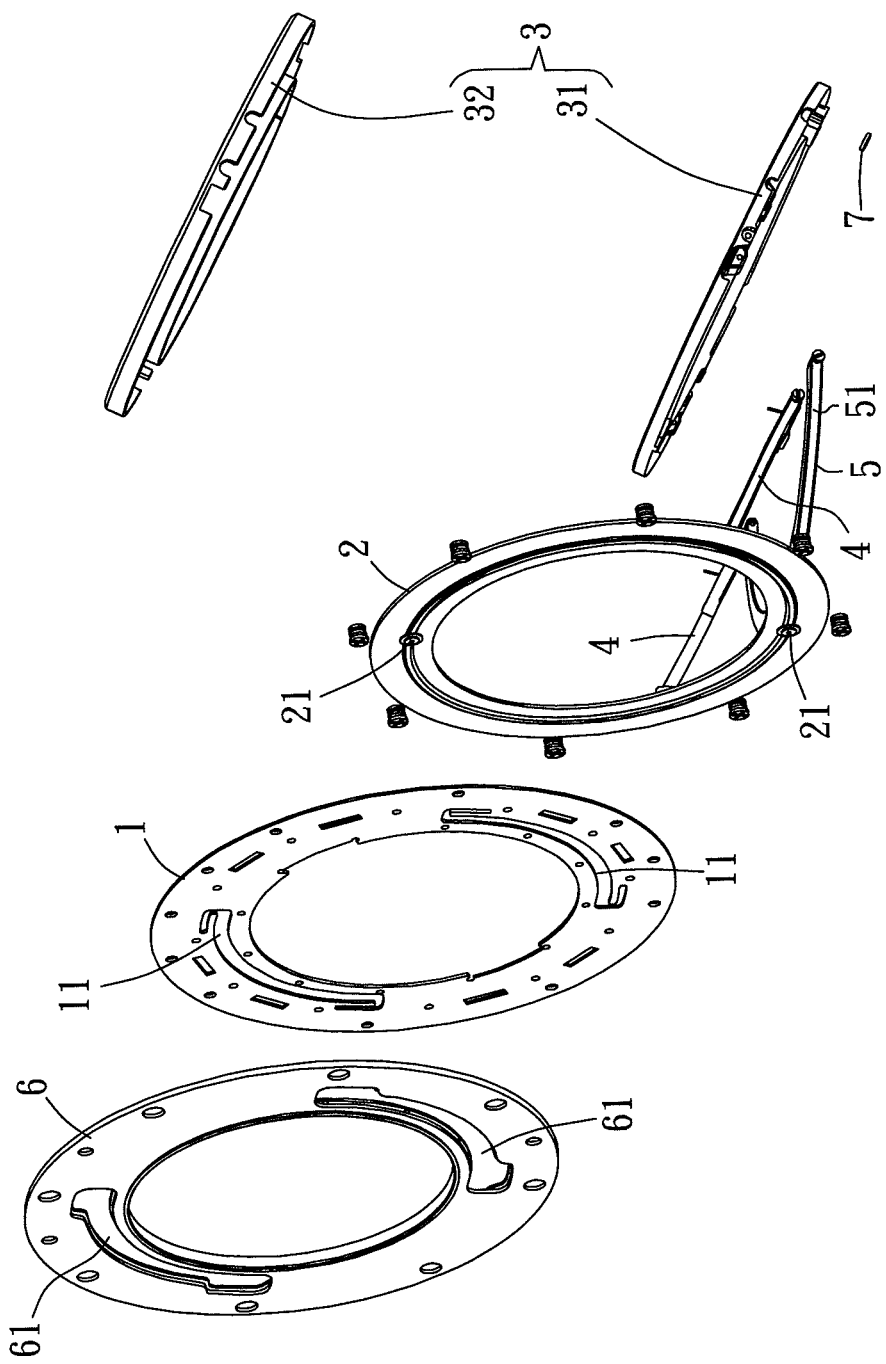
FIG. 2 is an exploded perspective view of the prop stand for electronic product according to the first preferred embodiment of the present invention viewed from a second viewing angle.
Figure 3:
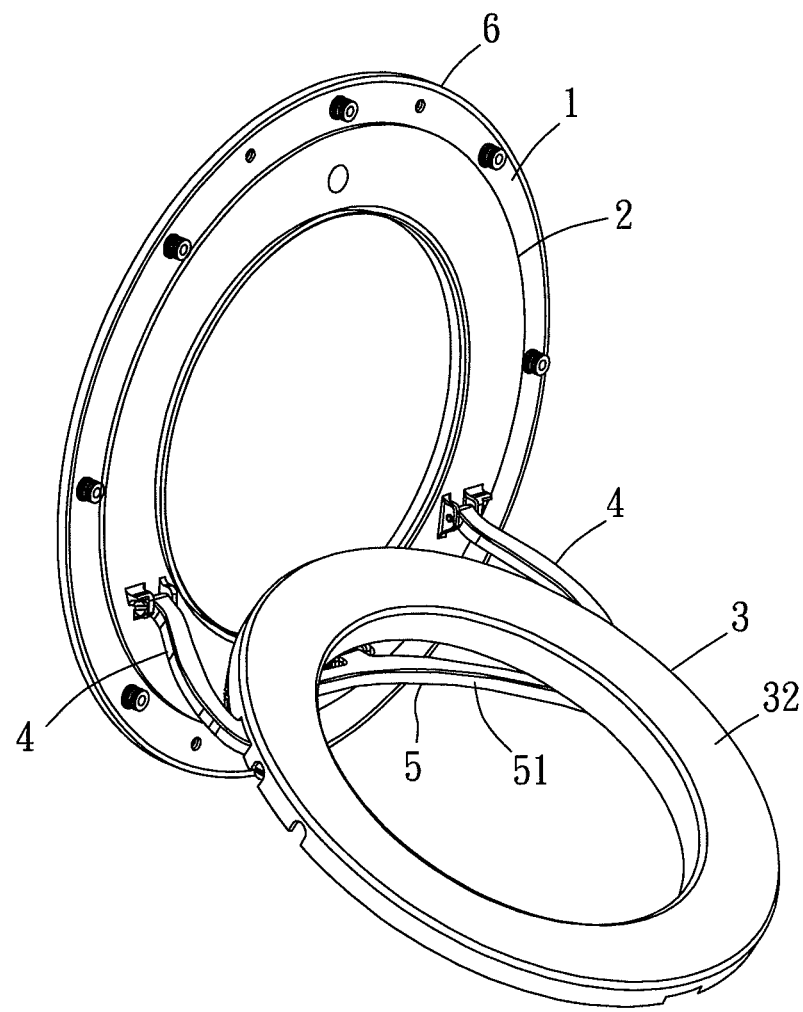
FIG. 3 is an assembled view of FIG. 1.
Figure 4:
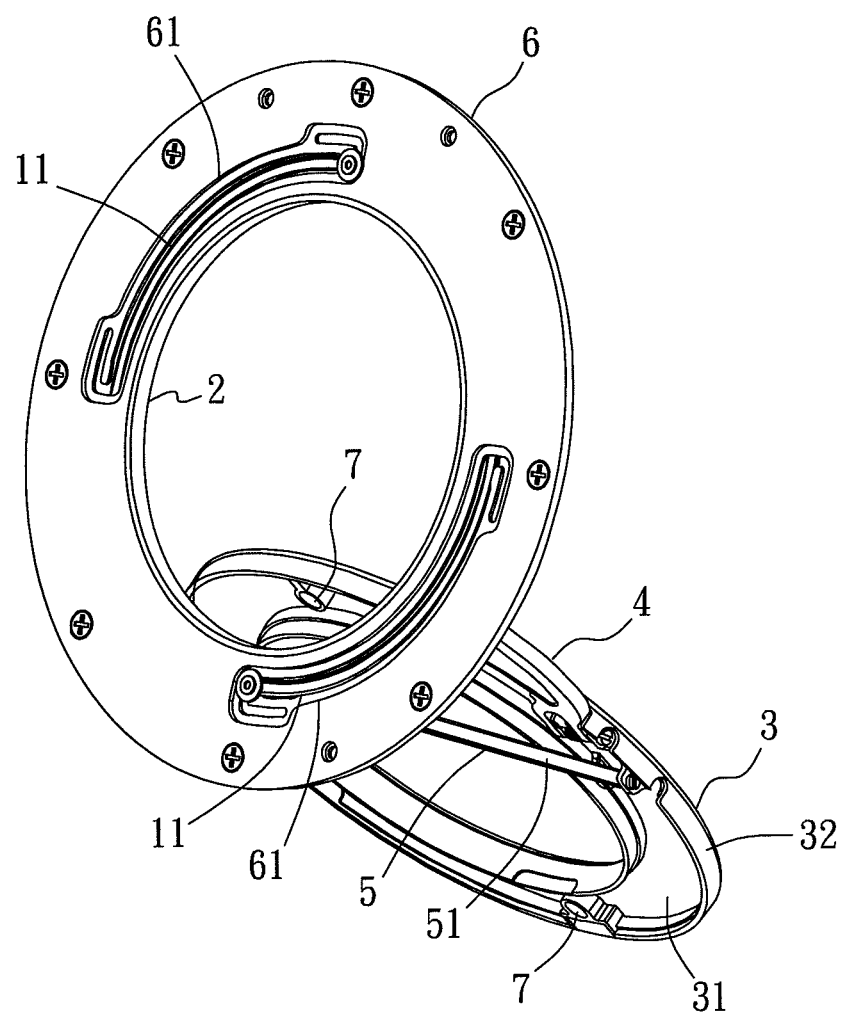
FIG. 4 is an assembled view of FIG. 2.

Please refer to FIGS. 1 and 2 that are exploded perspective views of a prop stand for electronic product according to a first preferred embodiment of the present invention. The prop stand can be mounted to a rear side of a main body or a protective case of an electronic product, such as a tablet computer or a mobile phone, so as to prop the electronic product in a substantially upright position or in a rearward inclined position. According to the first preferred embodiment, the prop stand includes a guide seat 1, a revolving seat 2, a propping unit 3, at least one first link 4, and at least one second link 5. The guide seat 1 is to be mounted to the rear side of the electronic product and is provided with at least one first rail 11. Or alternatively, two first rails 11 can be provided as illustrated in FIGS. 1 and 2. The first rail 11 can be configured as an arcuate slot penetrating the guide seat 1 in a thickness direction thereof. The revolving seat 2 is rotatably assembled to the guide seat 1, as shown in FIG. 3, and includes at least one guide element 21 for movably engaging with the first rail 11 on the guide seat 1. Preferably, two guide elements 21 are provided, as shown in FIGS. 2 and 4. The guide elements 21 can be configured as locating pins capable of extending into the first rails 11. The propping unit 3 serves as a propping seat, which, when not in use, can be folded to attach to the revolving seat 2. To use the propping unit 3, simply pull it from the folded position, in which the propping unit 3 is attached to the revolving seat 2, to an extended position, in which the propping unit 3 is located away from the revolving seat 2 to prop the electronic product. The first link 4 has a proximal end pivotally connected to the revolving seat 2 and a distal end pivotally connected to the propping unit 3 for moving the propping unit 3 between the folded position and the extended position. The second link 5 is pivotally connected at a proximal end to the revolving seat 2 and at a distal end to the propping unit 3 for moving the propping unit 3 between the folded position and the extended position.

In the prop stand for electronic product according to the present invention, the revolving seat 2, the at least one first link 4, the at least one second link 5, and the propping unit 3 together constitute a four-bar linkage (but a five-bar linkage is also available). The first and the second link 4, 5 can move the propping unit 3 to the folded position to attach to the revolving seat 2, and can also move the propping unit 3 to the extended position to locate away from the revolving seat 2. And, when the revolving seat 2 is rotated, the first link 4, the second link 5 and the propping seat 3 are brought to rotate along with the revolving seat 2 at the same time, so that an angular position of the four-bar linkage relative to the electronic product is adjustable for propping the electronic product in an upright or a rearward inclined position for use.

Figure 5:
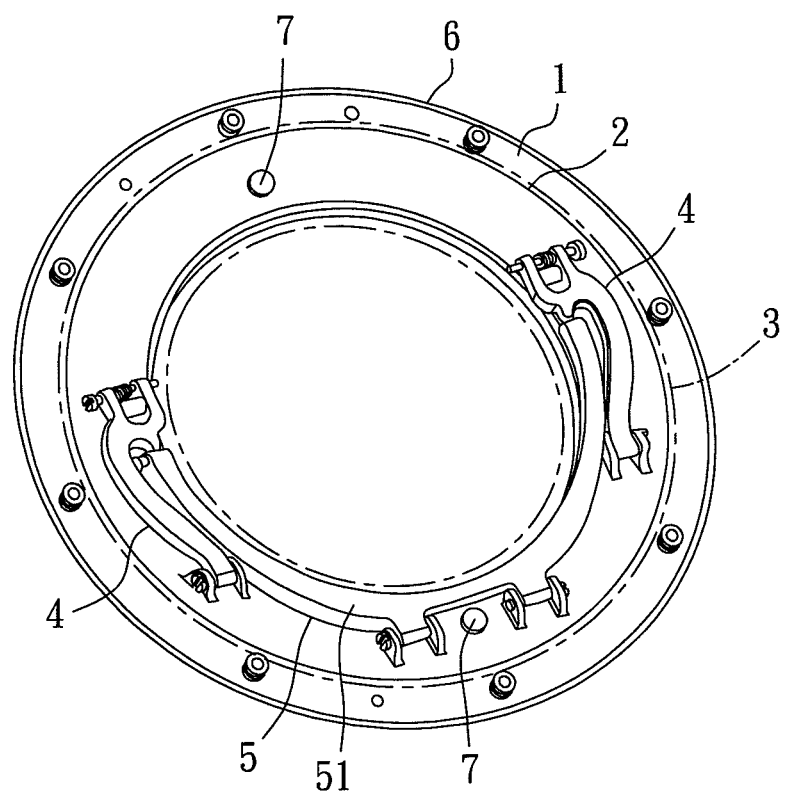
FIG. 5 shows the prop stand according to the first preferred embodiment of the present invention in a fully folded position.

As can be seen in FIG. 1, the prop stand in the illustrated first preferred embodiment includes two symmetrically arranged first links 4. The first links 4 can be arcuate bars or any other differently shaped bars, and have their proximal ends pivotally connected to two sides of the revolving seat 2 and their distal ends pivotally connected to the propping unit 3. And, in the illustrated first preferred embodiment, the prop stand includes one single second link 5, which can be a semicircular bar 51 or any other differently shaped bar. The semicircular bar 51 is pivotally connected at a middle point thereof to a point of the revolving seat 2 located between the two first links 4, and at two distal ends thereof to the propping unit 3. Further, the guide seat 1, the revolving seat 2, and the propping unit 3 can be respectively implemented as a ring-shaped member or other suitable shape, such that a logo or trademark bearing on the rear side of the electronic product is visible from outside of the prop stand, and particularly, the first and second links 4, 5 are invisibly covered by the propping unit 3 when the propping unit 3 is in the folded position to attach to the revolving seat 2, as shown in FIG. 5. On the other hand, as shown in FIGS. 3 and 4, when a user pulls the propping unit 3, the first and second links 4, 5 can be simultaneously extended for the propping unit 3 to move into the extended position for use.

Please refer back to FIGS. 1 and 2. For the propping unit 3 to pivotally connect to the first and second links 4, 5 while keeping an esthetic appearance, the propping unit 3 in a preferred embodiment preferably includes a ring-shaped seat 31 and a ring-shaped ornamental cap 32. In this case, the first links 4 have their proximal ends pivotally connected to the revolving seat 2 and their distal ends pivotally connected to the ring-shaped seat 31. Similarly, the second link 5 is pivotally connected at its middle point to the revolving seat 2 and at its two distal ends to the ring-shaped seat 31. The ring-shaped ornamental cap 32 can show a color or be made of a material according to that for an enclosure of the electronic product, and is attached to one side of the ring-shaped seat 31 opposite to the first and second links 4, 5. Apparently, to enable easy and convenient assembling, the propping unit 3 can be designed to include only one or a plurality of ring-shaped members without being limited to what is described herein.

As can be seen in FIGS. 1 and 2, the prop stand according to the first preferred embodiment of the present invention further includes a mounting seat 6 and at least one magnetic element 7. The mounting seat 6 can also be a ring-shaped member or be any other suitable form, and has one side aligned with and fixed to one side of the guide seat 1 opposite to the revolving seat 2, such that the other side of the mounting seat 6 can be attached to the rear side of the electronic product. The mounting seat 6 includes at least one second rail 61 corresponding to the first rail 11 of the guide seat 1 for guiding the guide element 21, such as a locating pin, of the revolving seat 2 to move along the second rail 61. The magnetic element 7 can be associated with the revolving seat 2 or the propping unit, so that the propping unit 3 in the folded position and the revolving seat 2 are magnetically attracted to each other, preventing the propping unit 3 from arbitrarily separating from the revolving seat 2 to cause inconvenience in carrying or using the prop stand of the present invention.

Figure 6:
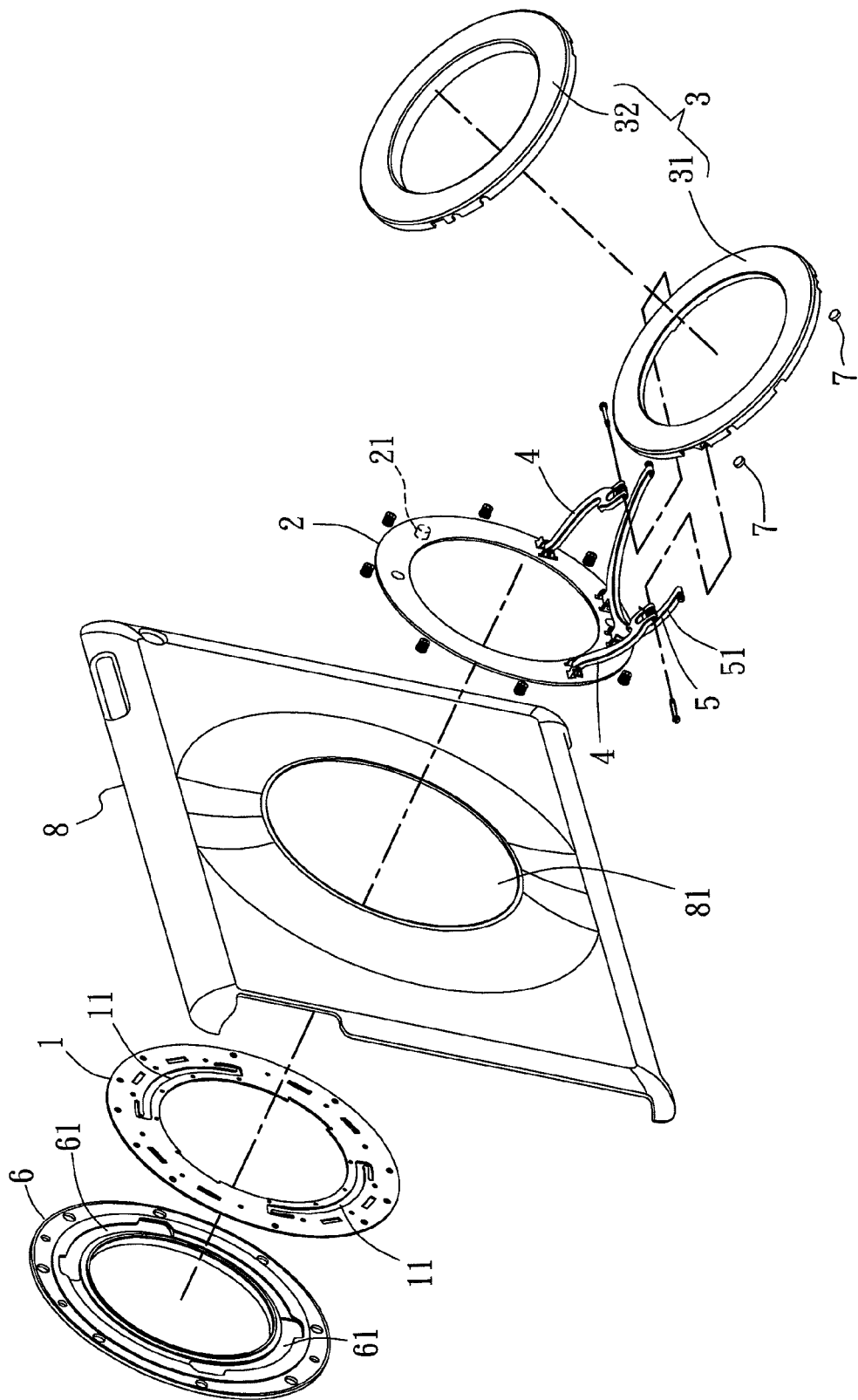
FIG. 6 is an exploded perspective view of a protective case structure for electronic product according to a second preferred embodiment of the present invention.
Figure 7:
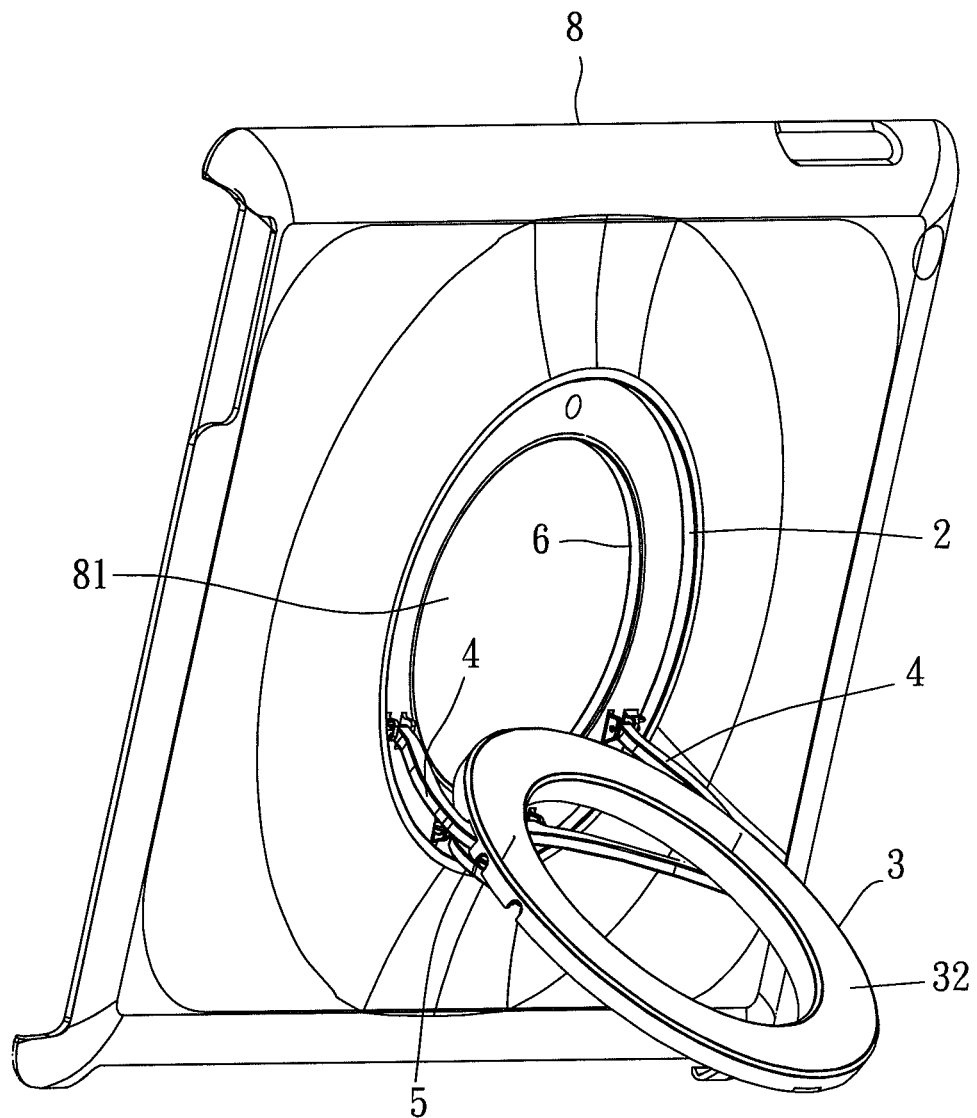
FIG. 7 is an assembled view of FIG. 6.

FIGS. 6 and 7 are exploded and assembled perspective views, respectively, of a protective case structure for electronic product according to a second preferred embodiment of the present invention. The protective case structure integrates the aforesaid prop stand according to the first preferred embodiment of the present invention with a protective case. More specifically, the protective case structure according to the second embodiment of the present invention includes a guide seat 1, a revolving seat 2, a propping unit 3, at least one first link 4, at least one second link 5, a mounting seat 6, and at least one magnetic element 7 as having been described above, as well as a protective case 8 for fitting on an electronic product. The protective case 8 is provided near a central area thereof with an opening 81, via which a logo shown on the rear side of the electronic product is visible from outside of the protective case structure. The guide seat 1, the revolving seat 2, the propping unit 3, the at least one first link 4, the at least one second link 5, the mounting seat 6, and the at least one magnetic element 7 all have structural characteristics the same as those described with the prop stand according to the first preferred embodiment of the present invention. Therefore, after the ring-shaped guide seat 1 and the mounting seat 6 have been fixed to a rear side of the protective case 8 around the opening 81, the revolving seat 2, the propping unit 3, the first links 4 and the second link 5 can be then sequentially assembled to the guide seat 1 behind the protective cover 8 in the same manner as having been described with the first preferred embodiment.

Figure 8:
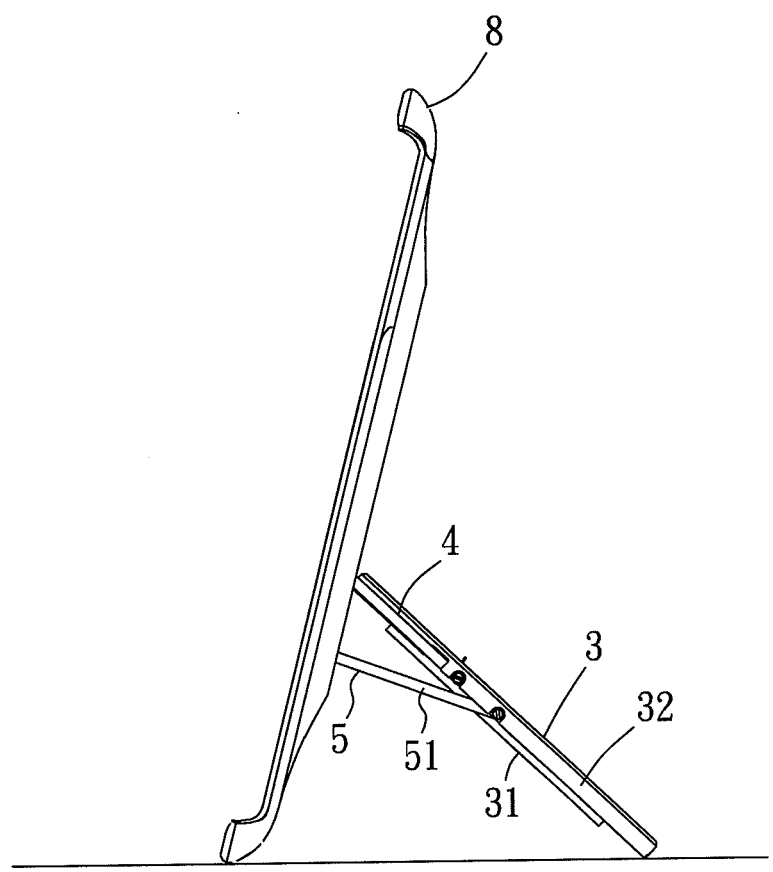
FIG. 8 is a side view showing the protective case structure according to the second preferred embodiment of present invention in a horizontal propping position.
Figure 9:
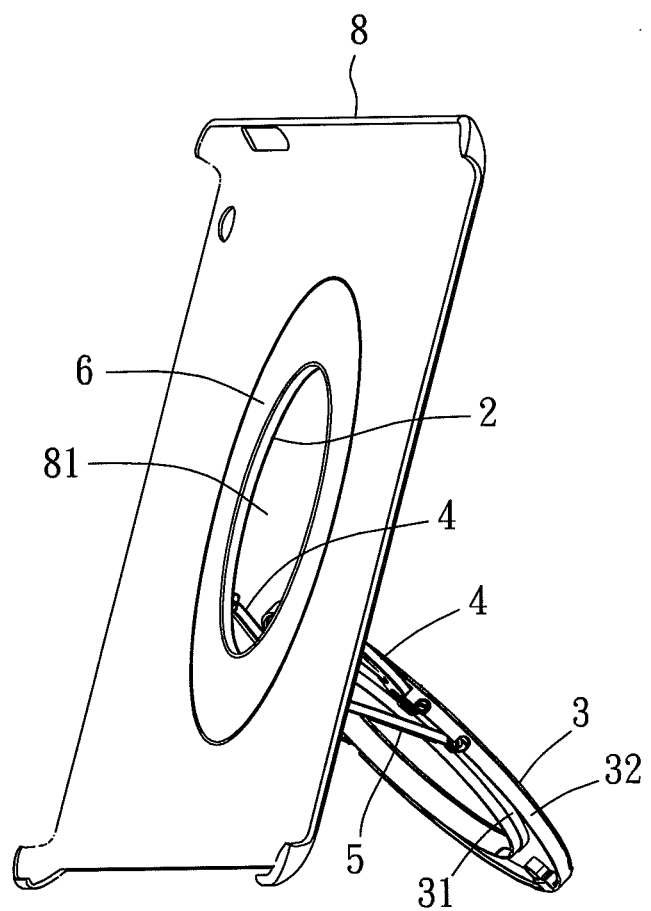
FIG. 9 is a front perspective view showing the protective case structure according to the second preferred embodiment of present invention in a vertical propping position.

Please refer to FIGS. 7 and 8. To use the protective case structure for electronic product according to the present invention, first fit the protective case 8 on the electronic product (not shown). When a user wants to use the electronic product, the user needs only to pull the propping unit 3, so that the first links 4 and the second link 5 forming part of the four-bar linkage are moved simultaneously to allow the propping unit 4 to locate at a fully extended position. That is, the propping unit is rearward extended from the rear side of the protective case 8 and the electronic product, so that the electronic product is horizontally propped in an upright position. In the event the user wants the electronic product to be vertically propped in an upright position, as shown in FIG. 9, the user needs only to rotate the revolving seat 2 for the propping unit 3 and the first and second links 4, 5 to rotate at the same time by 90 degrees, and the electronic product can be vertically propped in an upright position.

Figure 10:
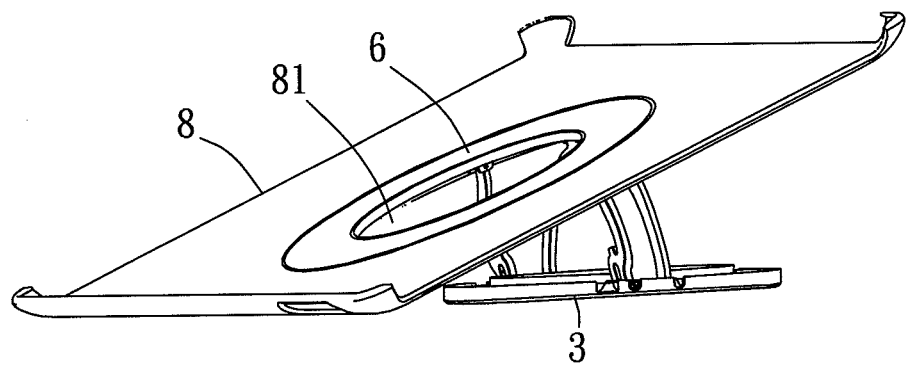
FIG. 10 is a perspective view showing the protective case structure according to the second preferred embodiment of present invention in an inclined propping position.
Figure 11:
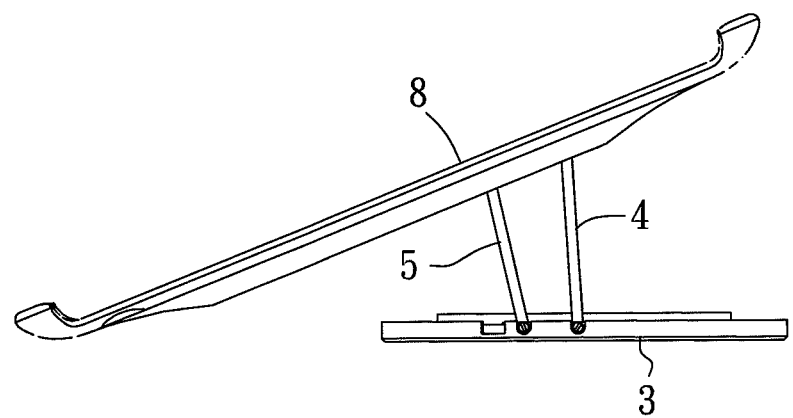
FIG. 11 is a side view of FIG. 10.
Figure 12:
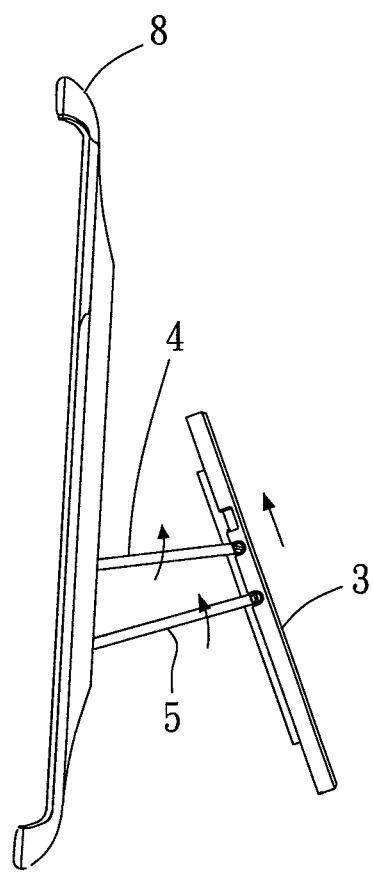
FIG. 12 is a side view showing the manner of folding a propping unit of the protective case structure according to the second preferred embodiment of present invention.
Figure 13:
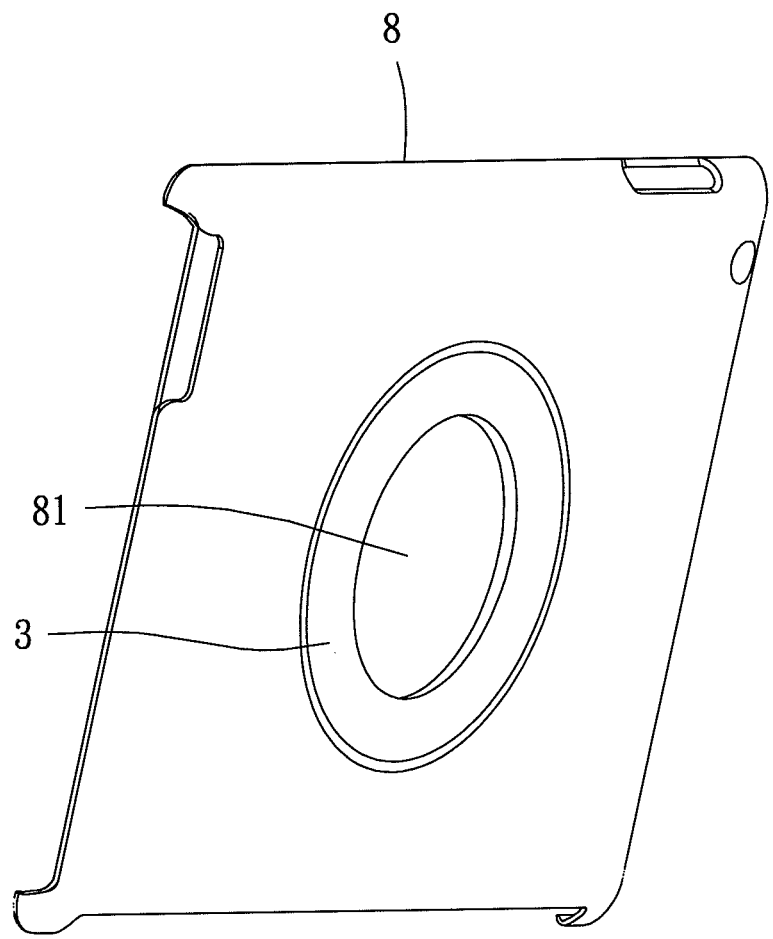
FIG. 13 is a perspective view showing the propping unit of the protective case structure according to the second preferred embodiment of present invention in a fully folded position.

Please refer to FIGS. 10 and 11. With the four-bar linkage formed from the revolving seat 2, the first links 4, the second link 5 and the propping unit 3, the protective case structure according to the second preferred embodiment of the present invention can also prop the electronic product in a rearward inclined position most suitable for typing. In the typing mode, the first links 4, the second link 5 and the propping unit 3 are extended from the rear side of the protective case 8 and the electronic product with the propping unit 3 flatly lying on a planar surface, such as a desk top or a user's lap top. Further, as shown in FIG. 12, when a user wants to set the propping unit 3 to the folded position, the user needs only to push the propping unit 3 in a direction along which the first and second links 4, 5 are allowed for moving, so that the whole propping unit 3 is moved to the folded position to attach to the revolving seat 2, as shown in FIG. 13. Meanwhile, as shown in FIG. 5, the first and second links 4, 5 all are invisibly located between the propping unit 3 and the revolving seat 2, giving the protect case 8 an esthetic flat (rear) surface and allowing the user to carry the electronic product in a very convenient manner.

While the use of the present invention to prop the electronic product in a horizontally or vertically upright position for viewing or to prop the electronic product in a rearward inclined position for typing has been described with the protective case structure having a protective case 8, it is understood the prop stand without the protective case 8 according to the first preferred embodiment of the present invention can also be directly mounted to the rear side of an electronic product and be manipulated in the same manner to prop the electronic product in a horizontally or vertically upright position for viewing or to prop the electronic product in a rearward inclined position for typing.

With the above arrangements, the present invention completely meets the requirements of being novel, improved, and industrially practical for use. The present invention is novel and improved because the prop stand or the protective case structure combines a four-bar or five-bar linkage with a revolving structure and can therefore be freely moved between a folded position and an extended position as well as to different angular positions according to actual need in use, making the prop stand easy to operate and convenient for use. The present invention is industrially practical for use because the structural characteristics and technical features of the prop stand or the protective case structure would no doubt satisfy the current market demands.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A prop stand for electronic product being configured for mounting to a rear side of an electronic product to prop the electronic product in a desired position, comprising:
    a guide seat for mounting to the rear side of the electronic product, and being provided with at least one first rail;
    a revolving seat being rotatably assembled to the guide seat, and being provided with at least one guide element for movably engaging with the at least one first rail;
    a propping unit;
    at least one first link having a proximal end pivotally connected to the revolving seat and a distal end pivotally connected to the propping unit; and
    at least one second link having a proximal end pivotally connected to the revolving seat and a distal end pivotally connected to the propping unit;
    wherein the first link and the second link are capable of moving the propping unit between a folded position, in which the propping unit is attached to the revolving seat, and an extended position, in which the propping unit is located away from the revolving seat.

2. The prop stand for electronic product as claimed in claim 1, wherein there are two symmetrically arranged first links, which are pivotally connected at respective proximal end to the revolving seat and at respective distal end to the propping unit.

3. The prop stand for electronic product as claimed in claim 2, wherein the second link is an arcuate bar having a middle point as the proximal end pivotally connected to the revolving seat and two distal ends pivotally connected to the propping unit.

4. The prop stand for electronic product as claimed in claim 1, wherein the guide seat, the revolving seat and the propping unit are ring-shaped members.

5. The prop stand for electronic product as claimed in claim 4, wherein the propping unit includes a ring-shaped seat and a ring-shaped ornamental cap; the first link being pivotally connected at the proximal end to the revolving seat and at the distal end to the ring-shaped seat of the propping unit; the second link being pivotally connected at the proximal end to the revolving seat and at the distal end to the ring-shaped seat of the propping unit; and the ring-shaped ornament cap being attached to one side of the ring-shaped seat opposite to the first and second links.

6. The prop stand for electronic product as claimed in claim 1, further comprising a mounting seat aligned with and fixed to one side of the guide seat opposite to the revolving sea, such that the mounting seat is attached at another opposite side to the rear side of the electronic product; and the mounting seat being provided with at least one second rail corresponding to the at least one first rail of the guide seat.

7. The prop stand for electronic product as claimed in claim 1, further comprising at least one magnetic element associated with one of the revolving seat and the propping unit.

8. A protective case structure for electronic product, being fitted on a rear side of an electronic product for protecting and propping the electronic product in a desired position, comprising:
    a protective case being fitted on the electronic product;
    a guide seat for mounting to a rear side of the protective case, and being provided with at least one first rail;
    a revolving seat being rotatably assembled to the guide seat, and being provided with at least one guide element for movably engaging with the at least one first rail;
    a propping unit;
    at least one first link having a proximal end pivotally connected to the revolving seat and a distal end pivotally connected to the propping unit; and
    at least one second link having a proximal end pivotally connected to the revolving seat and a distal end pivotally connected to the propping unit;
    wherein the first link and the second link are capable of moving the propping unit between a folded position, in which the propping unit is attached to the revolving seat, and an extended position, in which the propping unit is located away from the revolving seat to prop the electronic product in different positions according to changes in a position of the at least one guide element in the at least one first rail.

9. The protective case structure for electronic product as claimed in claim 8, wherein there are two symmetrically arranged first links, which are pivotally connected at respective proximal end to the revolving seat and at respective distal end to the propping unit.

10. The protective case structure for electronic product as claimed in claim 9, wherein the second link is an arcuate bar having a middle point as the proximal end pivotally connected to the revolving seat and two distal ends pivotally connected to the propping unit.

11. The protective case structure for electronic product as claimed in claim 8, wherein the guide seat, the revolving seat and the propping unit are ring-shaped members.

12. The protective case structure for electronic product as claimed in claim 11, wherein the propping unit includes a ring-shaped seat and a ring-shaped ornamental cap; the first link being pivotally connected at the proximal end to the revolving seat and at the distal end to the ring-shaped seat of the propping unit; the second link being pivotally connected at the proximal end to the revolving seat and at the distal end to the ring-shaped seat of the propping unit; and the ring-shaped ornament cap being attached to one side of the ring-shaped seat opposite to the first and second links.

13. The protective case structure for electronic product as claimed in claim 8, further comprising a mounting seat aligned with and fixed to one side of the guide seat opposite to the revolving sea, such that the mounting seat is attached at another opposite side to the rear side of the protective case; and the mounting seat being provided with at least one second rail corresponding to the at least one first rail of the guide seat.

14. The protective case structure for electronic product as claimed in claim 8, further comprising at least one magnetic element associated with one of the revolving seat and the propping unit.

* * * * *